United States Patent
Gulli et al.

(10) Patent No.: US 9,956,820 B2
(45) Date of Patent: May 1, 2018

(54) SEALING ASSEMBLY FOR ROLLING BEARINGS, IN PARTICULAR FOR A HUB BEARING UNIT OF VEHICLES AND ASSOCIATED HUB BEARING UNIT

(71) Applicants: Carmelo Gulli, Turin (IT); Davide Antonio Olivieri, Turin (IT); Michel Organisciak, Utrecht (NL); Marco Panchetti, Turin (IT); Héctor Villalobos, Turin (IT)

(72) Inventors: Carmelo Gulli, Turin (IT); Davide Antonio Olivieri, Turin (IT); Michel Organisciak, Utrecht (NL); Marco Panchetti, Turin (IT); Héctor Villalobos, Turin (IT)

(73) Assignee: AKTIEBOLAGET SKF, Gothenburg (SE)

(*) Notice: Subject to any disclaimer, the term of this patent is extended or adjusted under 35 U.S.C. 154(b) by 22 days.

(21) Appl. No.: 15/045,611

(22) Filed: Feb. 17, 2016

(65) Prior Publication Data

US 2016/0236509 A1 Aug. 18, 2016

(30) Foreign Application Priority Data

Feb. 17, 2015 (IT) .............................. 102015064570
Feb. 17, 2015 (IT) .............................. 102015065433

(51) Int. Cl.
*B60B 27/00* (2006.01)
*F16J 15/447* (2006.01)
(Continued)

(52) U.S. Cl.
CPC ........ *B60B 27/0073* (2013.01); *F16C 33/782* (2013.01); *F16C 33/7883* (2013.01);
(Continued)

(58) Field of Classification Search
CPC ............... F16C 33/782; F16C 33/7823; F16C 33/7876; F16C 33/7873; F16C 33/7883;
(Continued)

(56) References Cited

U.S. PATENT DOCUMENTS 4,669,895 A * 6/1987 Colanzi ............... F16C 33/7879
384/477
5,201,533 A * 4/1993 Lederman ............ F16J 15/3264
277/551
(Continued)

FOREIGN PATENT DOCUMENTS

DE 102008017409 A1 * 10/2009
EP 0524133 A1 1/1993
(Continued)

*Primary Examiner* — James Pilkington
(74) *Attorney, Agent, or Firm* — Bryan Peckjian; SKF USA Inc. Patent Dept.

(57) ABSTRACT

A sealing assembly insertable between a stationary outer ring and a rotating inner ring of a bearing or hub bearing unit, having a first C-shaped shield supported by the inner ring and a second L-shaped shield supported by the outer ring. The first shield has a first annular sealing element having a first annular lip that extends axially cantilevered from the flange portion of the second shield in a position facing a radially outer sleeve shaped portion of the first shield and a second annular lip, elastically deformable, arranged radially on the inside of the first lip and which cooperates in contact with a radially inner sleeve shaped portion of the first shield, which carries a second sealing element having a third annular lip, which extends axially cantilevered from the first shield and towards the second shield and which is radially interposed between the first and the second lip.

3 Claims, 3 Drawing Sheets

(51) Int. Cl.
*F16C 33/80* (2006.01)
*F16J 15/3232* (2016.01)
*F16C 33/78* (2006.01)
*F16J 15/3264* (2016.01)
*F16C 19/18* (2006.01)

(52) U.S. Cl.
CPC ......... *F16C 33/805* (2013.01); *F16J 15/3232* (2013.01); *F16J 15/3264* (2013.01); *F16J 15/447* (2013.01); *B60B 2900/511* (2013.01); *F16C 19/184* (2013.01); *F16C 2240/60* (2013.01); *F16C 2326/02* (2013.01)

(58) Field of Classification Search
CPC ............... F16C 33/805; F16C 2240/60; B60B 27/0073; B60B 2900/511; B60B 2900/5112; B60B 2900/5114; B60B 2900/5116; B60B 2900/5118; F16J 15/3232; F16J 15/3264; F16J 15/447
See application file for complete search history.

(56) References Cited

U.S. PATENT DOCUMENTS

| | | | | |
|---|---|---|---|---|
| 5,944,321 A | * | 8/1999 | Niebling | F16C 33/7879 277/549 |
| 5,947,611 A | * | 9/1999 | Nagase | F16C 33/7879 384/448 |
| 2003/0209858 A1 | | 11/2003 | Maldera et al. | |
| 2007/0222161 A1 | | 9/2007 | Voydatch et al. | |

FOREIGN PATENT DOCUMENTS

| | | | |
|---|---|---|---|
| EP | 0942188 A2 | | 9/1999 |
| EP | 1174718 A1 | | 1/2002 |
| EP | 1795787 A1 | | 6/2007 |
| EP | 2787233 A1 | | 10/2014 |
| JP | 2001-193748 | * | 7/2001 |
| JP | 4300412 | * | 7/2009 |

* cited by examiner

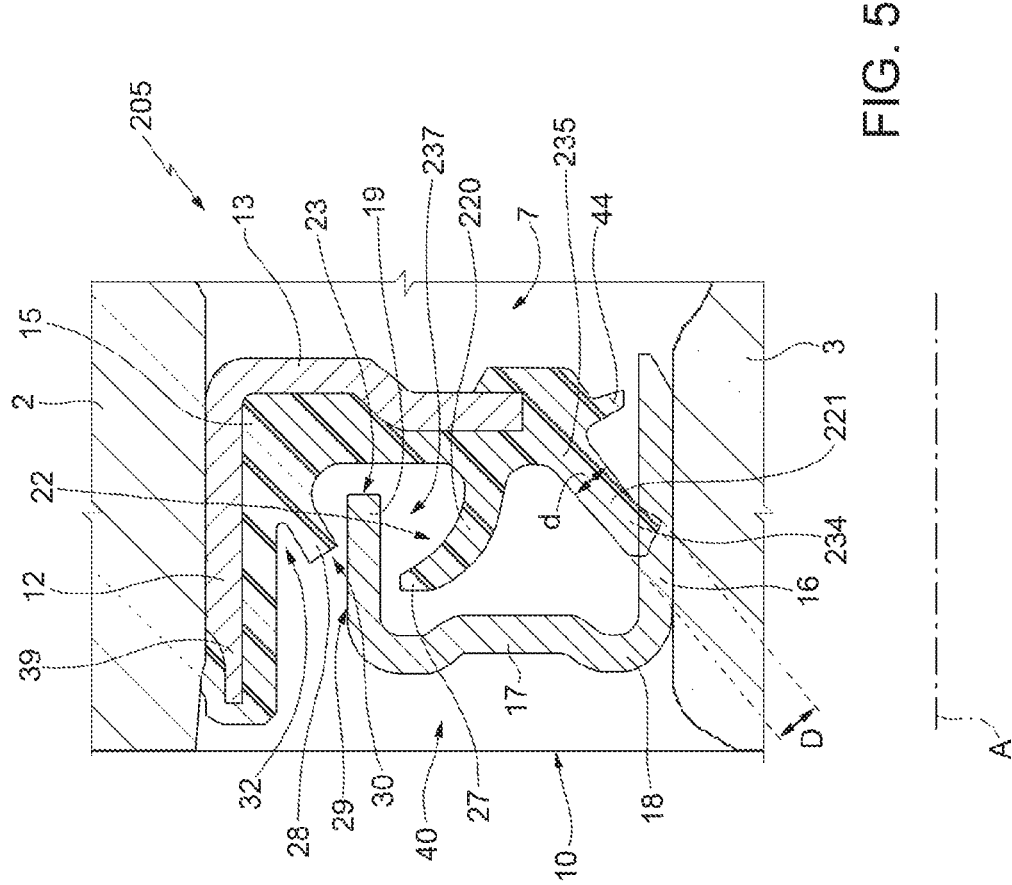

SEALING ASSEMBLY FOR ROLLING BEARINGS, IN PARTICULAR FOR A HUB BEARING UNIT OF VEHICLES AND ASSOCIATED HUB BEARING UNIT

TECHNICAL FIELD OF THE INVENTION

The present invention relates to a sealing assembly for rolling bearings, in particular for use in a hub bearing unit of vehicles, particularly, but not exclusively, useful both on the "outboard" side, i.e. facing, in use, the vehicle external body side of the unit itself, and "inboard", i.e. facing the inside of the vehicle, having high sealing efficiency against external contaminants and low friction, as well as to a hub bearing unit provided with the same.

KNOWN ART

As known, the hub bearing units of vehicles comprise an outer ring, for example stationary in use, and an inner ring, for example rotating in use, provided on the outboard side of the hub bearing unit with a mounting flange for a vehicle wheel. Between the inner and outer rings respective seal assemblies are interposed, one on the outboard side and one on the opposite side, referred to as "inboard".

Among the most used seal assemblies, not only on hub bearing units but more generally on rolling bearings, there are the so-called "cassette" seals that comprise two rigid shields L-shaped in radial section, one of which is provided with an elastomeric gasket provided with a plurality of sliding lips. The known seal assemblies are relatively satisfactory, but often have large overall dimensions and relatively high friction. To achieve low friction the number of sliding lips can be reduced, relying in whole or in part to non-contacting labyrinth type seals. This, however, may decrease the efficiency of the seal, allowing a small part of the contaminants to come in contact with the one sliding lip, resulting in a premature wear of the same. In addition, both due to machining tolerances and the so-called "cornering" stresses in use, sliding seals, especially axial ones may possibly perform incorrectly.

The described drawbacks are not eliminated by the solution according to EP1795787A1 based on the use of a labyrinth seal between the two shields, formed by substantially rigid and opposite elastomeric projections. Actually, the contaminants that penetrate beyond the labyrinth seal are then discharged only with difficulty from a collecting chamber internal to the seal and thus increase the wear of the contacting lip. Furthermore the "cornering" problem is not solved.

SUMMARY OF THE INVENTION

The object of the present invention is to provide a sealing assembly for rolling bearings, particularly but not exclusively suitable to be used in a hub bearing unit of a vehicle wheel, having excellent hydraulic sealing characteristics against external contaminants, low overall dimensions and low friction.

According to the invention a sealing assembly for rolling bearings and a hub bearing unit provided with said sealing assembly having the characteristics set forth in the appended claims are thus provided.

BRIEF DESCRIPTION OF THE DRAWINGS

The invention will now be described with reference to the accompanying drawings, which show non-limiting embodiments thereof, wherein:

FIG. 5 illustrates schematically and in enlarged scale, a third embodiment of the seal assembly according to the invention, replaceable in FIGS. 1 and 3 to the embodiments of FIGS. 2 and 4.

DETAILED DESCRIPTION OF SOME EMBODIMENTS

Figure 1:
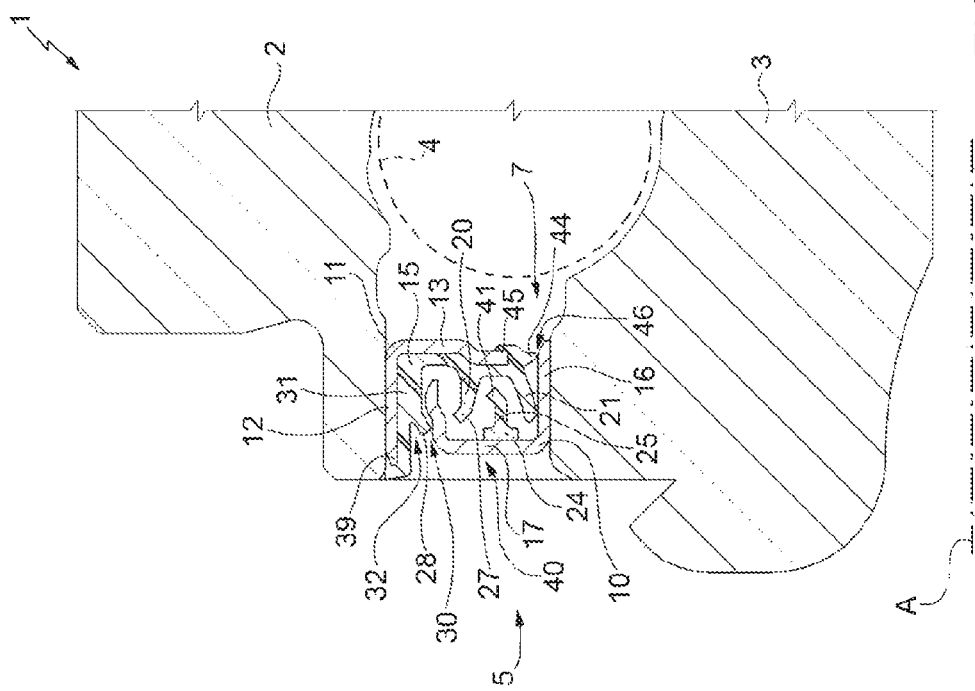
FIG. 1 illustrates schematically a view in radial section of a portion of a vehicle hub bearing unit (partial-view or partial-section), provided with a sealing assembly implemented according to the invention.

With reference to FIG. 1, reference number 1 denotes as a whole a rolling bearing, in the example illustrated constituting a hub bearing unit and comprising an outer ring 2, an inner ring 3, a plurality of rolling bodies 4 (only one of which for sake of clarity is shown in dashed-lines) interposed between the outer ring 2 and the inner ring 3 to make them rotatable, one with respect to the other, about a common rotation axis A, and a seal assembly 5, arranged fitted in-between the rings 2 and 3, illustrated truncated for simplicity, to close an annular space 7 radially bounded between the rings 2 and 3 and which accommodates the rolling bodies 4.

Generally, the rings 2 and 3 may be part of a rolling bearing of any known type, whether it is part or not of the hub bearing unit 1. In any case, the outer ring 2 is stationary in use, while the inner ring 3 is rotating in use around a relative common rotation axis A of the rings 2 and 3, which in general is also a common symmetry axis of the seal assembly 5 and of one or both rings 2 and 3. When the rings 2 and 3 are part of a hub bearing unit, the stationary outer ring 2, for example, is fixed to an upright of the vehicle suspension, known and not illustrated for simplicity, while the inner rotating ring 3 is made integral with a vehicle wheel, known and not illustrated for simplicity.

The seal assembly 5 comprises (FIG. 2) a first rigid annular shield 10, made of metallic or plastic or polymeric material, designed to be integrally carried, in use, by a first bearing ring, in this case by the inner ring 3 rotating in use, and a second rigid annular shield 11, also made of metal or plastic or polymeric material, designed to be integrally carried in use by a second bearing ring, in this case by the outer ring 2, stationary in use.

The second annular shield 11 is shaped in radial section like an upside down L facing the outside of bearing 1, i.e. facing on the side opposite to the annular space 7, and comprises a radially outer sleeve-shaped journalling portion 12 and a flange portion 13 which extends radially cantilevered inwards from a first end 14 (FIG. 2) of the journalling portion 12 facing the side opposite to the first annular shield 10 and towards the inside of bearing 1.

The annular shield 11 furthermore integrally and radially carries on the inside an annular sealing element 15 made of elastomeric material, which has been made integral in an indivisible manner (unless broken) to the shield 11 during vulcanization by means of a known process.

According to a first aspect of the invention, in combination with the described structure of the shield 11, the first annular shield 10 is shaped in radial section like a C, whose concavity faces the annular shield 11 and faces towards the annular space 7 and, so, towards the inside of bearing 1; the first shield 10 comprises a first radially inner sleeve portion 16 defining a journalling portion of the shield 10, a flange portion 17 which extends radially cantilevered outwards from a first end 18 of the sleeve portion 16, end 18 facing the side opposite to the first annular shield 11, and a second radially outer sleeve portion 19 extending axially, cantilevered from the flange portion 17 on the same side of the first sleeve portion 16, to which the sleeve portion 19 is radially facing and to which it is coaxial in relation to a common symmetry axis A of the shields 10,11, coincident with the relative rotation axis between the rings 2 and 3.

Always in combination with what has already been described, the annular sealing element 15 comprises a first annular lip 20 which extends axially cantilevered from the flange portion 13 of the shield 11 and towards the shield 10, rotating in use, also known by the term "flinger", so as to be radially interposed between the first radially inner sleeve portion 16 and the second radially outer sleeve portion 19 of the shield 10, radially closer to the radially outer sleeve portion 19 than to the radially inner sleeve portion 16.

The sealing element 15 also comprises a second annular lip 21, elastically deformable, which is arranged radially on the inside of the first annular lip 20 and which extends axially and radially (therefore is oriented inclined with respect to the axis A) to cooperate in contact and with a certain interference, albeit reduced, with the first rigid shield 10 and, in particular, according to the non limiting embodiment shown, with the sleeve portion 16, with which it defines a sliding seal which, in the embodiment shown, is a radial sliding seal.

In combination with this configuration, the annular lip 20 is shaped so as to radially delimit on the outside a first annular channel 22 facing a free end edge 23 of the radially outer sleeve portion 19 of the C-shaped shield 10; the free edge 23 is opposite to the flange portion 17 of the first shield 10.

Figure 2:
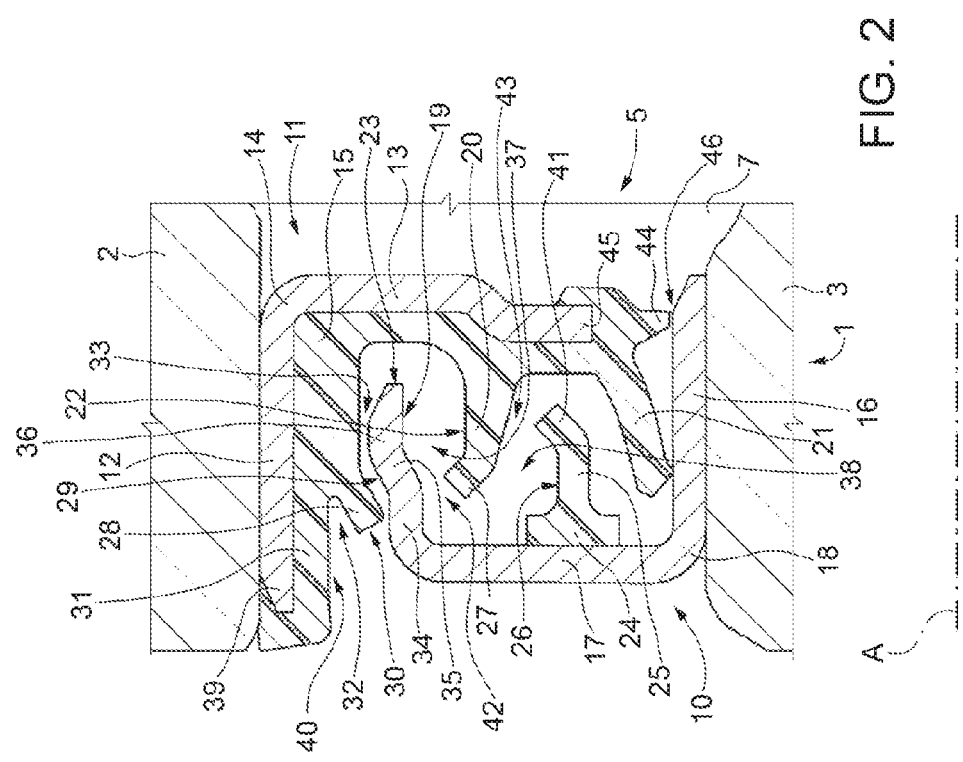
FIG. 2 illustrates schematically and in enlarged scale a detail of FIG. 1, which shows the conformation of a first embodiment of the seal assembly according to the invention.

According to the non limiting embodiment shown in FIGS. 1 and 2, the first shield 10 carries integrally with the flange portion 17 thereof and on the side facing the second shield 11 a second annular sealing element 24 made of elastomeric material and including a third annular lip 25, which extends axially cantilevered from the shield 10 and towards the shield 11 and which is radially interposed between the lip 20 and the lip 21.

The annular lip 25 is shaped so as to radially delimit, on the outside, a second annular channel 26 (FIG. 2) facing a free end 27 of the annular lip 20.

In this way, the shield 10 defines in radial section, together with the annular sealing element 24, an E-shaped element whose prongs or arms, defined by the two sleeve shaped portions 16 and 19 and by the annular lip 25 are arranged radially alternated with the lips 20 and 21, forming therewith a labyrinth radial path.

The annular sealing element 15 also comprises, according to a further and important aspect of the invention, a further annular lip 28 which extends radially and axially cantilevered from the journalling portion 12 of the shield 11 and towards the flange portion 17 of the shield 10, such as to be interposed between the journalling portion 12 and the radially outer sleeve shaped portion 19 of the shield 10, next on the outside to the same in the radial direction and obliquely to the flange portion 17 of the first rigid shield 10.

The annular lip 28 is elastically deformable and is designed to assume selectively a first and a second configurations, different to one another; in the first configuration, non-deformed and shown in FIG. 2, the annular lip 28 is in its normal operational condition, in which lip 28 is not subjected to outer stresses and is not, therefore, elastically deformed; in such first configuration, in normal operational use, lip 28 does not contact a radially outer lateral surface 29 (FIG. 2) of the sleeve shaped portion 19, defining instead, therewith, a sufficiently small radial clearance to form a first labyrinth seal 30, radially directed; in the second configuration, deformed and not illustrated for sake of simplicity, lip 28, in response to an external force applied to the sealing assembly 5, contacts the radially outer lateral surface 29 forming a contacting sliding seal thereon.

For this purpose, the annular lip 28 extends cantilevered from an axially intermediate position of the journaling portion 12 of the second rigid shield 11, such that, radially on the outside of the annular lip 28, a first annular recess 32 is delimited between lip 28 and the journaling portion 12, which first recess radially enlarges in axial direction towards the flange portion 17 of the first rigid shield 10.

In the non limitative embodiment shown, lip 28 extends cantilevered from an axially intermediate position of a first portion 31 of the elastomeric sealing element 15 which radially covers on the inside at least part of the journalling portion 12 of the shield 11 so that, radially on the outside of the annular lip 28, the first recess 32 is delimited between lip 28 and the portion 31 of the annular sealing element 15.

In the non limitative embodiment shown in FIGS. 1 and 2, between the portion 31 of the elastomeric sealing element 15 which, in the non-limiting example illustrated, completely covers radially on the inside the entire journalling portion 12, and the sleeve shaped portion 19 is also present a sufficiently small radial clearance to define a second radial labyrinth seal 33 developing axially.

The labyrinth seal 33 extends axially by at least a stretch of the axial extension of the sleeve portion 19.

In the preferred embodiment illustrated, the sleeve portion 19 comprises (FIG. 2), starting from the flange portion 17, a first annular stretch 34, a second annular stretch 35 and a third annular stretch 36.

The first annular stretch 34 is straight and is arranged parallel to the annular lip 25, the second annular stretch 35 is slanted so as to be distanced from the symmetry axis A on the side opposite to the first stretch 34, and the third annular stretch 36 is, proceeding in the axial direction, firstly radially bulged on the outside, then becomes thin in a radial direction towards the free end edge 23 of the sleeve shaped portion 19.

In the illustrated example, the labyrinth seal 33 extends axially by at least part of the axial extension of the third stretch 36.

According to an aspect of the invention, the first and the second annular channel 22 and 26 are designed to intercept and collect any external contaminants which may overcome the first labyrinth seal 30 and also the eventual supplementary labyrinth seal 33; furthermore, between the annular channel 22 formed by lip 20 and the sleeve portion 19 a first annular chamber 37 for collecting said contaminants is delimited (FIG. 2), arranged downstream of the labyrinth seal 33, and a second annular chamber 38 for collecting the contaminants is delimited between the lip 20 and the lip 25. Therefore, the labyrinth seal 33 is arranged upstream of chambers 37 and 38 having regard the incoming direction of the contaminants.

The lip 28 is, according to an aspect of the invention, adapted to radially bend outwards (also thanks to the presence of the annular recess 32) to allow an easy and quick outflow of the contaminants by gravity from the collecting chambers 37,38.

Preferably, the annular shield 10 is arranged axially on the inside of the annular shield 11, so that a second end 39 of the journalling portion 12, opposite to the end 14 and in this case completely covered by the portion 31 of the elastomeric sealing element 15, axially delimits a second annular recess 40 on the outside of the shield 10, in front of it and on the opposite side to the flange portion 13.

According to another aspect of the invention, the lip 20 and the lip 25 each have a respective free end, the end 27 already described for the lip 20 and an end 41 for the lip 25, which are radially bent outwards and towards the sleeve portion 19; a first radial annular space 42 and a second radial annular space 43 are delimited, between the end 27 and the sleeve portion 19 and between the end 41 and the lip 20 having substantially similar dimensions, respectively.

The first annular sealing element 15 also comprises a fifth annular lip 44 which extends inwardly and radially cantilevered from a radially inner edge 45 of the flange portion 13 and which cooperates with the sleeve shaped portion 16 of the shield 10 to define a third labyrinth seal 46 therewith.

In this way, the contacting sealing lip 21 is placed highly sheltered from external contaminants; in case of particularly abundant flows of contaminants, the lip 28 bends inward and closes, preventing the inflow of contaminants, then successively opens and allows the removal by gravity of said contaminants that might have previously entered and were collected in the channels 22 and 26 and in the chambers 37 and 38.

Moreover, the sealing lip 21 and also the entire sealing assembly 5 are immune from any axial displacements between the shields 10,11 with respect to the designed expected position, both as a result of machining tolerances and of deformations in use, for example during the "cornering".

Figure 4:
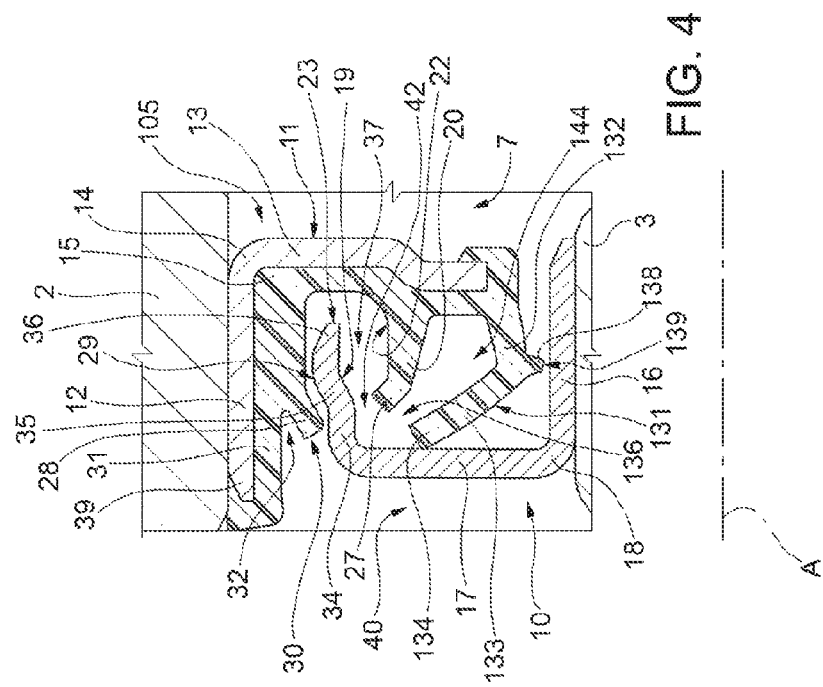
FIG. 4 illustrates schematically and in enlarged scale a detail of FIG. 3, which shows the conformation of the second embodiment of the seal assembly according to the invention.
Figure 3:
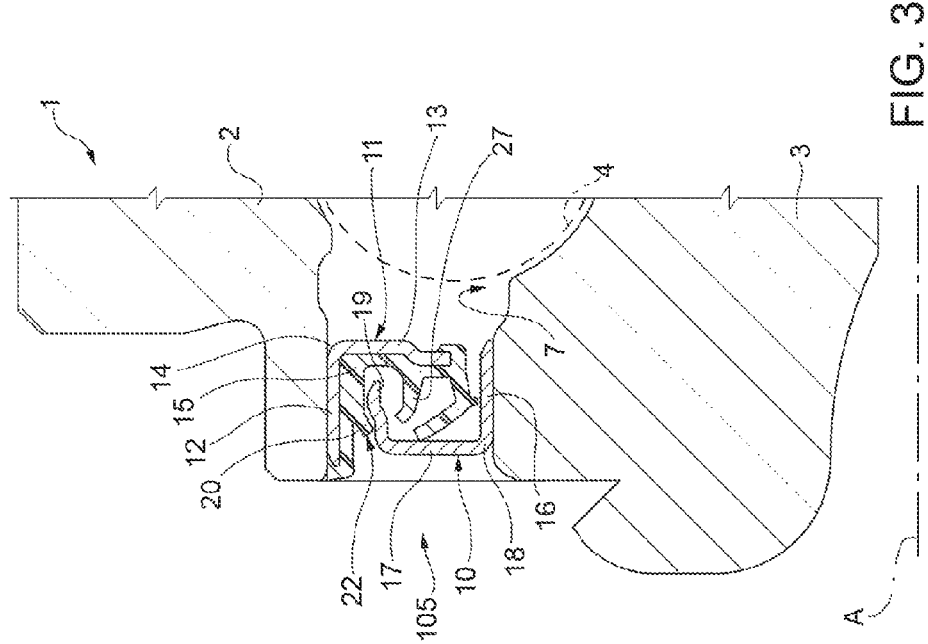
FIG. 3 illustrates schematically a view in radial section of a portion of a vehicle hub bearing unit (partial-view or partial-section), provided with a sealing assembly implemented according to a second embodiment of the invention.

With reference now to FIGS. 3 and 4, they show a sealing assembly 105 made according to the invention. Details similar to or identical to those as already described are indicated, for sake of simplicity, with the same reference numbers.

Sealing assembly 105 is substantially identical to sealing assembly 5 already described except for not possessing the sealing element 24 with lip 25, and the lips 21 and 44. The sealing element 15 comprises, instead, in combination with what has been described, an elastically deformable annular lip 131, which replaces lip 21. Lip 131 is arranged radially inside the annular lip 20 and extends axially past the lip 20 to cooperate in contact with the flange portion 17 of the rotary shield 10, with which it defines, according to this embodiment of the invention, an axial sliding seal.

The annular lip 131, according to the preferred but not limitative embodiment illustrated, is shaped in radial section like an open V and comprises a root portion 132 immediately adjacent to the flange portion 13 of the shield 11 and an end portion 133 arranged slanted with respect to the axis A so as to move away from the sleeve shaped portion 16 of the shield 10 as it approaches the flange portion 17 of the shield 10 itself.

The lip 131 has at its end portion 133 a free end 134 which cooperates in contact with the flange portion 17; similarly the lip 20 has the free end 27, which is radially bent outwards and towards the sleeve portion 19 so as to be slanted with respect to axis A, with an inclination substantially similar to that of the portion 133 of the lip 131.

The free ends 134 and 27 delimit therebetween a first radial annular space 136 having dimensions substantially similar to the one of the radial annular space 42 delimited between the free end 27 and the sleeve shaped portion 19 of the shield 10, thus allowing to optimize the spaces and facilitate in use the emptying of the collecting chamber 37.

The described shape of the portion 19 is a further barrier against the entry of contaminants into the chamber 37 and into the collecting channel 222 and, by defining towards the chamber 37 a sort of "flared" conduit i.e. enlarging towards the chamber 37, it favors emptying by gravity.

The annular sealing element 15 preferably also comprises (FIG. 4) a further annular lip 138, which extends radially inwards from the lip 131, from a point comprised between the root portion 132 and the end portion 133 of the annular lip 131, and which cooperates radially outwards with the flange portion 16 of the shield 10 to define therewith a second labyrinth seal 139.

In case of strong external pressure or during the "cornering" of the vehicle provided with the hub bearing unit 1, the lip 28 becomes sliding, thus although increasing friction only temporarily and slightly (thanks to reduced interferences that are created), but drastically increasing the sealing and protection action of the lip 131.

These advantages are finally also achieved thanks to the fact that the sliding seal performed by the lip 131 is an axial seal and to the fact that the free end 134 of the lip 131 is located radially on the outside of a second annular collecting chamber 144 for the external contaminants which is bounded between the lips 131 and 20 and wherein the channel 22 pours from the free end 27, which serves as a weir or drain, a possible excess of contaminants that are in the chamber 37 without the latter affecting the free sealing end 134 of the lip 131.

With reference to FIG. 5, reference number 205 indicates a further and preferred embodiment of the sealing assembly according to the invention. Details similar to or identical to those as already described are indicated, for sake of simplicity, with the same reference numbers.

Sealing assembly 205 is similar to sealing assembly 5, from which it differs only for the shape of the sleeve portion 19, which is simplified and is simply cylindrical, and for the shape of the first elastically deformable annular lip, indicated with 220, which possesses an arc of a circle shape and defines the first annular channel 22 with its own concavity, which faces towards the second sleeve portion 19 of the first rigid shield 10; the first annular lip 220 has a curvature such as to delimit, with the second sleeve portion 19 and with the first elastically deformable annular lip 28, a collecting chamber 237 for possible contaminants which pass beyond the first labyrinth seal 30.

The collecting chamber 237 is shaped like a C facing towards the first rigid shield 10 and has a depth taken in radial direction substantially equal to or greater than its own width taken in axial direction.

The first elastically deformable annular lip 220 extends axially on the same side of annular lip 28 and axially beyond the latter to form with the flange portion 17 of the first rigid shield 10 either a sliding seal or a labyrinth seal.

Furthermore, the second annular lip 21 is replaced by an elastically deformable lip 221, which cooperates in sliding manner with the first sleeve portion 16 of the first rigid shield 10 by means of a free end 234 thereof, which end has in radial section a thickness D greater than the thickness d of a root portion 235 of the annular lip 221 facing towards the flange portion 13 of the second rigid shield 11.

This shape of lip 221 allows a greater flexibility of the same to be obtained and at the same time allows a wider contact surface to be obtained between lip 221 and lateral surface of the sleeve portion 16, improving the sealing action.

All the objects of the invention are thus achieved.

The invention claimed is:

1. A sealing assembly for rolling bearings, adapted to be inserted between a first rotating ring and a second stationary ring, to protect an annular space from external contaminants delimited between the first and second rings, comprising:
a first shield which is annular and designed to be supported by the first ring and a second shield which is annular and designed to be supported by and in direct contact with the second ring; wherein:
i) the second shield is L-shaped in radial section and provides a radially outer sleeve-shaped journaling portion and a flange portion that extends cantilevered radially inwards starting from a first end of the journaling portion; the second shield integrally and radially carrying on a side facing the first shield a first annular sealing element made of elastomeric material; and wherein:
ii) the first shield is C-shaped in radial section and opens towards the second shield and includes a first radially inner sleeve portion defining a journaling portion of the first shield, a flange portion that extends cantilevered radially outwards starting from a first end of the first sleeve portion, the first end being located on an opposite side of the first sleeve portion from the flange portion of the second shield, and a second sleeve portion which extends axially cantilevered from the flange portion of the first shield on the same side of the first sleeve portion of the first shield; the first and second sleeve portion of the first shield being radially facing to one another and being coaxial in relation to a common symmetry axis (A) of the first and second shield;
iii) the first annular sealing element having a first, elastically deformable, annular lip that extends axially cantilevered from the flange portion of the second shield and towards the first shield to be radially interposed between the first and the second sleeve portion of the first shield; and a second annular lip, elastically deformable, which is positioned radially on the inside of the first annular lip and extends axially and radially to cooperate in contact with the first shield, with which it defines a sliding seal;
iv) the first annular lip is shaped to delimit radially outwardly a first annular channel facing towards a free end edge of the second sleeve portion of the first shield, the free end edge being located on an opposite side of the second sleeve portion from the flange portion of the first shield; wherein
v) the first annular sealing element provides a third annular lip, elastically deformable, which extends radially and axially cantilevered from the journaling portion of the second shield and towards the flange portion of the first shield, to be interposed between the journaling portion of the second shield and the second sleeve portion of the first shield, obliquely to the flange portion of the first shield, wherein the third annular lip extends cantilevered from a first portion of the first elastomeric sealing element that radially inwardly covers at least part of the journaling portion of the second shield and also extends cantilevered from an axially intermediate position of the journaling portion of the second shield, such that, radially on the outside of the third annular lip, a first annular recess delimited between the third annular lip and the first portion of the first annular sealing element, and the first annular recess radially enlarges in an axial direction towards the flange portion of the first shield;

vi) the third annular lip designed to selectively assume: a first configuration, non-deformed, in which it does not contact a radially outer lateral surface of the second sleeve portion of the first shield, defining therewith a radial clearance to form a first labyrinth seal and a second configuration, deformed, in which, in response to the application of a force external to the sealing assembly, it contacts the radially outer lateral surface of the second sleeve portion of the first shield, forming a sliding seal thereon;

vii) wherein between the first portion of the first elastomeric sealing element that radially inwardly covers at least part of the journaling portion of the second shield and the second sleeve portion of the first shield there is a radial clearance to define a second radial labyrinth seal, and (viii) the first shield integrally carries on the flange portion thereof and on the side facing towards the second shield a second annular sealing element made of elastomeric material and including a fourth annular lip, which extends axially cantilevered from the first shield and towards the second shield and which is radially interposed between the first and the second annular lip; the fourth annular lip shaped to delimit radially outwardly a second annular channel facing a free end of the first annular lip, wherein in the first configuration the third annular lip allows the outflow by gravity of possible contaminants that overcome the first labyrinth seal from at least one collecting chamber for the contaminants delimited between the first annular channel and the second sleeve portion of the first shield.

2. A sealing assembly for rolling bearings, adapted to be inserted between a first rotating ring and a second stationary ring, to protect an annular space from external contaminants delimited between the first and second rings, comprising a first shield which is annular and designed to be supported by the first ring and a second shield which is annular and designed to be supported by the second ring; wherein:
i) the second shield is L-shaped in radial section and provides a radially outer sleeve-shaped journaling portion and a flange portion that extends cantilevered radially inwards starting from a first end of the journaling portion; the second shield integrally and radially carrying on a side facing the first shield a first annular sealing element made of elastomeric material; and wherein:
ii) the first shield is C-shaped in radial section and opens towards the second shield and includes a first radially inner sleeve portion defining a journaling portion of the first shield, a flange portion that extends cantilevered radially outwards starting from a first end of the first sleeve portion, the first end being located on an opposite side of the first sleeve portion from the flange portion of the second shield, and a second sleeve portion which extends axially cantilevered from the flange portion of the first shield on the same side of the first sleeve portion of the first shield; the first and second sleeve portion of the first shield being radially facing to one another and being coaxial in relation to a common symmetry axis (A) of the first and second shield;

iii) the first annular sealing element having a first, elastically deformable, annular lip that extends axially cantilevered from the flange portion of the second shield and towards the first shield to be radially interposed between the first and the second sleeve portion of the first shield; and a second annular lip, elastically deformable, which is positioned radially on the inside of the first annular lip and extends axially and radially to cooperate in contact with the first shield, with which it defines a sliding seal;

iv) the first annular lip is shaped to delimit radially outwardly a first annular channel facing towards a free end edge of the second sleeve portion of the first shield, the free end edge being located on an opposite side of the second sleeve portion from the flange portion of the first shield; wherein v) the first annular sealing element provides a third annular lip, elastically deformable, which extends radially and axially cantilevered from the journaling portion of the second shield and towards the flange portion of the first shield, to be interposed between the journaling portion of the second shield and the second sleeve portion of the first shield, obliquely to the flange portion of the first shield;

vi) the third annular lip designed to selectively assume: a first configuration, non-deformed, in which it does not contact a radially outer lateral surface of the second sleeve portion of the first shield, defining therewith a radial clearance to form a first labyrinth seal; and a second configuration, deformed, in which, in response to the application of a force external to the sealing assembly, it contacts the radially outer lateral surface of the second sleeve portion of the first shield, forming a sliding seal thereon;

wherein the third annular lip extends cantilevered from an axially intermediate position of the journaling portion of the second shield, such that, radially on the outside of the third annular lip, a first annular recess is delimited between it and the journaling portion, which first recess radially enlarges in an axial direction towards the flange portion of the first shield; the third annular lip extends cantilevered from a first portion of the first elastomeric sealing element that radially inwardly covers at least part of the journaling portion of the second shield, the first annular recess delimited between the third annular lip and the first portion of the first annular sealing element;

wherein between the first portion of the first elastomeric sealing element that radially inwardly covers at least part of the journaling portion of the second shield and the second sleeve portion of the first shield there is a radial clearance to define a second radial labyrinth seal;

wherein the first shield integrally carries on the flange portion thereof and on the side facing towards the second shield a second annular sealing element made of elastomeric material and including a fourth annular lip, which extends axially cantilevered from the first shield and towards the second shield and which is radially interposed between the first and the second annular lip; the fourth annular lip shaped to delimit radially outwardly a second annular channel facing a free end of the first annular lip;

wherein in the first configuration the third annular lip allows the outflow by gravity of possible contaminants that overcome the first labyrinth seal from at least one collecting chamber for the contaminants delimited between the first annular channel and the second sleeve portion of the first shield; wherein the second sleeve portion of the first shield further comprises, starting from the flange portion of the first shield, a first, a second and a third annular portion; the first annular portion being straight, the second annular portion being slanted to be distanced from the symmetry axis (A) on the side opposite the first portion, and the third annular portion being straight in a direction parallel to the first annular portion, when moving along the second sleeve portion from the first annular portion to the end of the third annular portion, the first annular portion first extends in an axial direction, then the second annular portion extends diagonally in a radially outward direction, and then the third annular portion extends axially, the third annular portion of the second annular sleeve having a decreasing radial thickness in cross section towards the free end edge of the second sleeve portion; the first, second and third portion extending towards the journaling portion of the second shield to define the second labyrinth seal along at least part of the third annular portion of the second sleeve portion of the first shield.

3. The sealing assembly according to claim 2, wherein the flange portion of the first shield is arranged axially between the first end and a second end of the journaling portion of the second shield.

* * * * *